(12) United States Patent
Lubomirsky et al.

(10) Patent No.: US 11,718,893 B2
(45) Date of Patent: Aug. 8, 2023

(54) METHOD FOR GOLD RECOVERY AND EXTRACTION FROM ELECTRONIC WASTE OR GOLD CONTAINING MINERALS, ORES AND SANDS

(71) Applicant: YEDA RESEARCH AND DEVELOPMENT CO. LTD., Rehovot (IL)

(72) Inventors: Igor Lubomirsky, Petach-Tikva (IL); Valery Kaplan, Rehovot (IL); Nurlan Dosmukhamedov, Rehovot (IL); Erzhan Zholdasbay, Rehovot (IL)

(73) Assignee: YEDA RESEARCH AND DEVELOPMENT CO. LTD., Rehovot (IL)

(*) Notice: Subject to any disclaimer, the term of this patent is extended or adjusted under 35 U.S.C. 154(b) by 363 days.

(21) Appl. No.: 16/759,751

(22) PCT Filed: Nov. 1, 2018

(86) PCT No.: PCT/IL2018/051167
§ 371 (c)(1),
(2) Date: Apr. 28, 2020

(87) PCT Pub. No.: WO2019/087193
PCT Pub. Date: May 9, 2019

(65) Prior Publication Data
US 2020/0332391 A1    Oct. 22, 2020

Related U.S. Application Data

(60) Provisional application No. 62/579,895, filed on Nov. 1, 2017.

(51) Int. Cl.
*C22B 11/06* (2006.01)
*C22B 1/00* (2006.01)
*C22B 11/02* (2006.01)

(52) U.S. Cl.
CPC .............. *C22B 11/06* (2013.01); *C22B 1/005* (2013.01); *C22B 11/025* (2013.01)

(58) Field of Classification Search
CPC ...................................................... C22B 11/06
See application file for complete search history.

(56) References Cited

U.S. PATENT DOCUMENTS 3,021,209 A    2/1962  Murray et al.
4,353,740 A *  10/1982  Dunn ...................... C22B 11/06
                                                                423/44
(Continued)

FOREIGN PATENT DOCUMENTS

CN    1904094 A        1/2007
IL     248600    *    2/2017  .......... C22B 11/026
(Continued)

OTHER PUBLICATIONS

Lloyd DD. "Standard sieves and Mesh sizes" Analytical Chemistry Resources. The University of the Est Indies. 2000. pp. 1-8. (Year: 2000).*

(Continued)

*Primary Examiner* — Jophy S. Koshy
*Assistant Examiner* — Joshua S Carpenter
(74) *Attorney, Agent, or Firm* — Mark S. Cohen; Pearl Cohen Zedek Latzer Baratz LLP

(57) ABSTRACT

A method for recovery of gold from gold-containing materials, such as electronic waste material, minerals and sands is described. The method includes crushing the gold containing material to obtain a particulate material. The particulate material is then preheated in an oxygen-containing gas environment in a preheating zone. The method also includes mixing the oxidized particulate material with a chlorine-containing material and treating the mixture in a reaction zone. The treatment is carried out by heating the (Continued)

mixture to provide thermal decomposition of the chlorine-containing material and produce a chlorine-containing gas mixture, and by applying an electromagnetic field to the chlorine-containing gas mixture to provide ionization of chlorine. A volatile gold-containing chloride product, produced in the reaction zone as a result of a chemical reaction between gold and chlorine ions, is then cooled to convert the volatile gold-containing chloride product into solid phase gold-containing materials.

25 Claims, 2 Drawing Sheets

(56) References Cited

U.S. PATENT DOCUMENTS

| | | | |
|---|---|---|---|
| 4,608,083 | A | 8/1986 | Holmstrom et al. |
| 5,074,910 | A | 12/1991 | Dubrovsky |
| 5,102,632 | A | 4/1992 | Allen et al. |
| 5,104,445 | A | 4/1992 | Dubrovsky et al. |
| 5,169,503 | A | 12/1992 | Baughman et al. |
| 5,484,470 | A | 1/1996 | Kristjansdottir et al. |
| 7,645,320 | B2 | 1/2010 | Evans |
| 2007/0131058 | A1 | 6/2007 | Bergeron et al. |
| 2008/0083300 | A1* | 4/2008 | Evans ............ C22B 11/06 75/637 |
| 2013/0177487 | A1 | 7/2013 | Roy et al. |
| 2016/0145714 | A1* | 5/2016 | Liddell ............ C22B 3/20 75/421 |
| 2017/0145542 | A1 | 5/2017 | Lubomirsky et al. |

FOREIGN PATENT DOCUMENTS

| | | | |
|---|---|---|---|
| JP | 2012219326 A | 12/2012 | |
| KR | 100959928 B1 | 10/2009 | |
| WO | WO1999022036 | 5/1999 | |
| WO | WO 2015/193901 A1 | 12/2015 | |
| WO | WO-2015193901 A1 * | 12/2015 | ............ B01J 19/08 |

OTHER PUBLICATIONS

Frayne, Colin. (2002). Boiler Water Treatment—Principles and Practice, vols. I-II—14.4.1 Composition of Air. (pp. 689). Chemical Publishing Company. (Year: 2002).*

Itakura et al. "Resource recovery from Nd—Fe—B sintered magnet by hydrothermal treatment" Journal of Alloys and Compounds. Feb. 9, 2006;408:1382-5.

Kamimoto et al. "Electrodeposition of rare-earth elements from neodymium magnets using molten salt electrolysis" Journal of Material Cycles and Waste Management. Oct. 2018;20(4):1918-22.

"Kiln" Merriam-Webster.com dictionary, Merriam-Webster, https://www.merriam-webster.com/dicitonary/kiln. Accessed Feb. 9, 2022. pp. 1-11.

Lloyd DD. "Standard sieves and Mesh sizes" Analytical Chemistry Resources. The University of the West Indies. 2000. pp. 1-8.

Office Action for Chinese Patent Application No. 201880071337.8 dated Sep. 29, 2021.

Shirayama et al. "Selective extraction and recovery of Nd and Dy from Nd—Fe—B magnet scrap by utilizing molten MgCl2" Metallurgical and Materials Transactions B. Jun. 2018;49(3):1067-77.

Zhang, Jinrui et al. "Gold Extraction Technology" Aug. 31, 2013, Version 1, pp. 13-15, Beijing: Metallurgical Industry Press. (English translation not available).

Zhang, Yifei et al. "Modern Gold Smelting Technology" Oct. 31, 2014, Version 1, pp. 143-144, Beijing: Metallurgical Industry Press. (English translation not available).

Hoffmann JE. "Recovery of platinum-group metals from gabbroic rocks metals from auto catalysts" JOM. Jun. 1, 1988;40(6):40-4.

International Search Report for PCT Application No. PCT/IL2018/051167 dated Jan. 17, 2019.

Jha et al. "Hydrometallurgical recovery/recycling of platinum by the leaching of spent catalysts: A review" Hydrometallurgy. Feb. 1, 2013:133:23-32.

Yoo JS. "Metal recovery and rejuvenation of metal-loaded spent catalysts" Catalysis Today. Sep. 30, 1993;44(1-4):27-46.

Zeng et al. "Current status and future perspective of waste printed circuit boards recycling" Prccedia Environmental Sciences. Jan. 1, 2012;16:590-7.

Khaliq et al. "Metal extraction processes for electronic waste and existing industrial routes: a review and Australian perspective" Resources. Feb. 19, 2014;3(1):152-79.

Office Action dated Apr. 20, 2022 (English translation) for related Chinese Patent Application No. 201880071337.8; including associates' translation of relevant material.

Xu et al. "Supported Acidic Photocatalystic Materials and Applications" Northeast Normal University Press, Version 2, pp. 77-78, Mar. 2015; no English translation availabe.

* cited by examiner

METHOD FOR GOLD RECOVERY AND EXTRACTION FROM ELECTRONIC WASTE OR GOLD CONTAINING MINERALS, ORES AND SANDS

TECHNOLOGICAL FIELD

The present invention relates generally to metallurgical techniques employed for separation and recovery of precious and rare metals, and in particular, to a method for recovery of gold from gold containing material such as industrial waste, minerals, ores and sands.

BACKGROUND

The demand for electrical and electronic equipment has increased dramatically with advancements in technology. Major innovations in electrical and electronic technologies have shortened the usable life of electrical and electronic equipment, and have thus enhanced the generation of electronic waste (e-waste). Global production of e-waste is increasing rapidly and is expected to accelerate even more so in the near future. This has resulted in the generation of large quantities of electronic waste that needs to be managed [A. Khaliq, M. A. Rhamdhani, G. Brooks, S. Masood; Metal Extraction Processes for Electronic Waste and Existing Industrial Routes: A Review and Australian Perspective; Resources, 2014, V. 3, P. 152-179].

The handling of e-waste, including combustion in incinerators, disposal in landfills, or exporting overseas, is no longer permitted, due to environmental pollution and global legislations. Additionally, the presence of precious metals (PMs) makes e-waste recycling attractive economically. For example, gold (Au) is used in electronics for its excellent resistance to corrosion and high electrical conductivity. It is known that manufacturing mobile phones and personal computers consumes 3% of Au mined worldwide each year. In fact, compared with natural Au ores, the Au content in electronic scrap and waste material is significantly higher (10 g to 1 kg Au per ton of electronic scrap as compared to 0.5 g to 13.5 g Au per ton of natural Au ore), creating an economic driving force for the recycling of electronic waste.

Existing pyrometallurgical processes for recovering Au from electronic waste are energy intensive, whereas hydrometallurgical processes, which use chemical lixiviants such as aqua regia (i.e., a mixture of concentrated nitric and hydrochloric acids), involve pollution, and are thus not environmentally sustainable. In addition, in certain scenarios, the extraction of primary Au from minerals, ores and sands can be difficult, environmentally prohibitive or otherwise not economically attractive using existing pyrometallurgical and hydrometallurgical processes.

For example, U.S. Pat. No. 4,353,740 describes a process for treating a particulated gold bearing ore to recover the gold therein. The process includes roasting the ore to remove sulfides such as sulfur dioxide, followed by chlorination of the ore at a temperature of about 350 degrees C. in the presence of iron to form a mixture of volatile gold chlorides and volatile gold-iron chlorides in the chlorine off gases, followed by condensing the gold compounds by passing the mixture through a salt such as sodium chloride to form a salt melt and separating the gold from the melt.

U.S. Pat. No. 5,074,910 describes a process to recover precious metals from sulfide ores. It involves chlorinating a mixture of an ore concentrate and salt to form a liquid melt. The salt preferably contains potassium chloride. This chlorination is carried out at a temperature between 300 degrees Celsius and 600 degrees Celsius while stirring. The process converts precious metals in the elemental and sulfide forms into precious metal chlorides which are recovered by subsequent processing steps U.S. Pat. No. 5,169,503 describes a process for extracting metal values from ores. The method includes: (a) solubilization of metal values from the ore, by treating the ore with a lixiviant comprising an aqueous solution of a chloride salt, a hypochlorite salt, and cyanuric acid; and (b) recovery of the metal values from the lixiviant.

U.S. Pat. No. 5,484,470 describes a process for dissolving gold metal in ligand and oxidant lixiviation systems, wherein the solubility of gold is enhanced by the addition of heterocyclic aromatic compounds containing nitrogen or sulfur in the ring.

U.S. Pat. No. 7,645,320 describes a process for extracting a precious metal from a precious metal containing source, comprising the steps of: (i) contacting the precious metal-containing source with a vapour phase chloride salt; (ii) condensing the precious metal containing volatile product of step (i); and (iii) recovering the precious metal from the condensed product of step (ii).

SUMMARY OF THE INVENTION

Despite the prior art in the area of gold recovery and extraction, there is still a need in the art for further improvement of a technique for recycling electronic waste for recovery of gold as well as further improvement of techniques for extracting primary gold from gold containing materials, such as minerals, ores and sands.

It would also be advantageous to have a method for recovery and extraction of gold with low environmental impact agents able to extract gold selectively and efficiently in mild conditions.

It would, in addition, be advantageous to have a method for recovery of gold from electronic waste which can be easily industrialized and which has significant yield of the recovered metal. In addition, there is a need in many scenarios for the extraction of primary Au for recovery of gold from minerals, ores and sands which can be easily industrialized and which has significant yield of the extracted metal.

The present disclosure satisfies the aforementioned need by providing a method for recovery of gold from electronic waste and extraction of Au from minerals, ores and sands.

The method includes crushing the gold containing material, such as electronic waste material or the gold containing minerals, ores and sands to obtain a particulate material. The particulate material includes particles having a predetermined grain size. For example, the predetermined grain size of the particulate material can be in the range of 0.07 mm to 40 mm.

In one embodiment, this invention provides a method for recovery of gold from gold-containing material, the method comprising:
- crushing said gold-containing material to obtain a gold-containing particulate material including particles having a predetermined grain size;
- optionally subliming other metals from said material;
- preheating said gold-containing particulate material in an oxygen-containing gas environment in a preheating zone to oxidize gold-containing particulate material;
- mixing the oxidized gold-containing particulate material with a chlorine-containing material;
- treating the mixture of the oxidized gold-containing particulate material with a chlorine-containing material in a reaction zone by (i) heating the mixture to provide thermal decomposition of the chlorine-containing material and produce a chlorine-containing gas mixture, (ii) applying an electromagnetic field to the chlorine-containing gas mixture to provide ionization of chlorine; thereby causing a chemical reaction between gold and chlorine ions and providing a volatile gold-containing chloride product in the reaction zone; and cooling said volatile gold-containing chloride product to convert said volatile gold-containing chloride product into solid phase gold-containing materials.

The method further includes preheating said particulate material. The preheating is carried out in an oxygen-containing gas environment in a preheating zone in order to oxidize particulate material. The preheating of the particulate material can, for example, be carried out at a temperature in the range of 150 degrees Celsius to 750 degrees Celsius for a time period in the range of 5 min to 60 min. A content of oxygen in the oxygen-containing gas environment in the preheating zone is in the range of 20 volume percent to 98 volume percent.

Then, the oxidized particulate material is mixed with a chlorine-containing material. An amount of the chlorine-containing material in the mixture can, for example, be in the range of 1 gram to 1 kilogram per kilogram of the gold containing material, such as electronic waste material or the gold containing minerals, ores and sands. Examples of materials suitable for the present invention include, but are not limited to, potassium hypochlorite, sodium hypochlorite, calcium hypochlorite, magnesium hypochlorite, barium hypochlorite, potassium chloride-hypochlorite, sodium chloride-hypochlorite, calcium chloride-hypochlorite, magnesium chloride-hypochlorite, barium chloride-hypochlorite, potassium chloride, sodium chloride, ammonium chloride, calcium chloride, magnesium chloride, barium chloride, aluminum chloride, nano silica and any combination thereof. The method further includes treating the mixture of the oxidized particulate material with a chlorine-containing material in a reaction zone. The treatment is carried out by heating the mixture and applying an electromagnetic field.

The heating of the mixture of the oxidized particulate material with a chlorine-containing material is carried out to provide thermal decomposition of the chlorine-containing material and produce a chlorine-containing gas mixture. The heating of the mixture to produce a chlorine-containing gas mixture can, for example, be carried out at a temperature in the range of 150 degrees Celsius to 400 degrees Celsius for a time period in the range of 5 min to 120 min.

An electromagnetic radiation is applied to a chlorine-containing gas mixture to provide ionization of chlorine, thereby causing a chemical reaction between gold and chlorine ions and providing a volatile gold-containing chloride product in the reaction zone. Ionization of the chlorine gas can, for example, be achieved by applying alternating electromagnetic field to the reaction zone at the frequency in the range of 50 kHz-12 GHz. An irradiance of the electromagnetic field in the reaction zone can, for example, be in the range of 0.1 kW/cm$^2$ to 10 kW/cm$^2$. The electromagnetic field can, for example, be applied to the chlorine-containing gas mixture to provide ionization of chlorine for a time period in the range of 5 min to 180 min.

According to an embodiment of the present invention, the heating of the mixture of the oxidized particulate material with the chlorine-containing material in the reaction zone is carried out simultaneously with the applying of the electromagnetic field to the chlorine-containing gas mixture.

According to an embodiment of the present invention, the method further includes passing a chlorine-containing gas from an external source through the reaction zone during the applying of an electromagnetic field. An amount of the chlorine-containing gas that is passed from an external source through the reaction zone can, for example, be in the range of 5 liters to 400 liters chlorine per a ton of said gold containing material, such as electronic waste material, minerals, ores and sands.

The method then includes cooling the volatile gold-containing chloride product to convert the volatile gold-containing chloride product into solid phase gold-containing materials.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
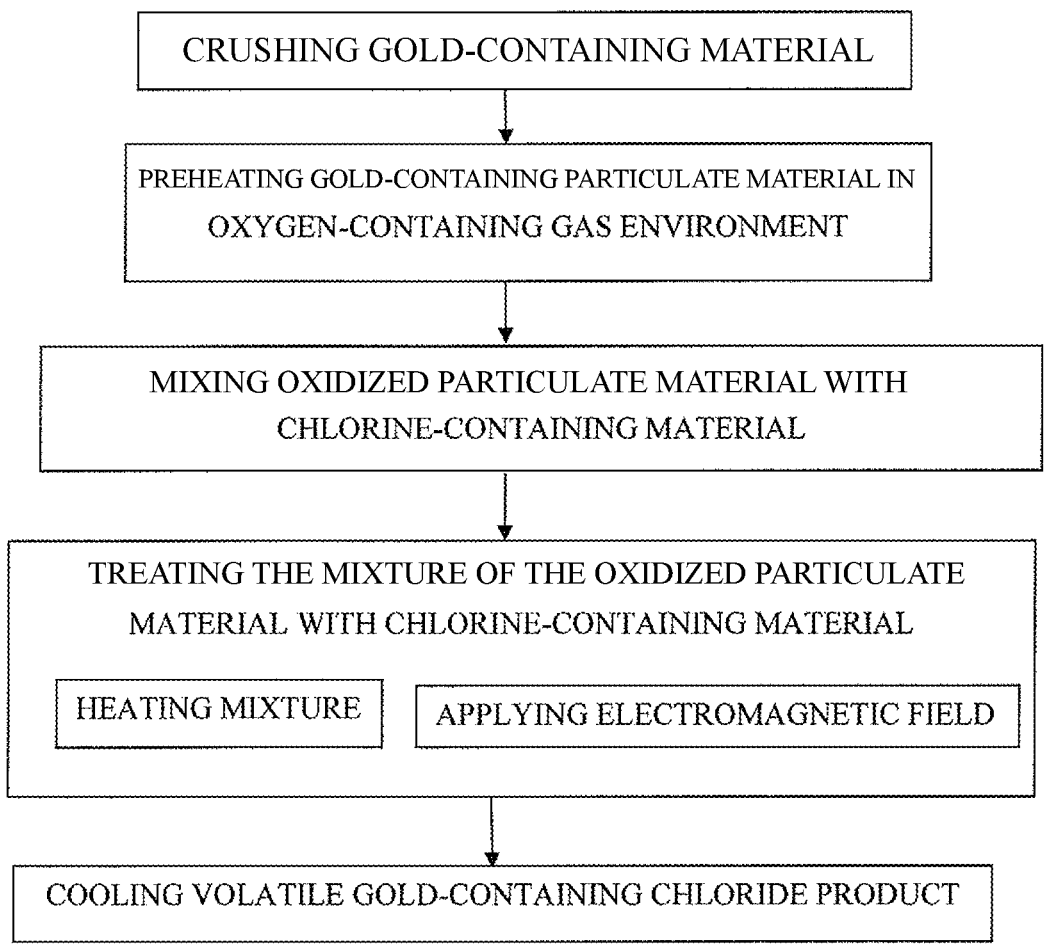
FIG. 1 is a schematic presentation of a method for recovery of gold from gold containing material, such as electronic waste material, minerals, ores and sands according to an embodiment of the present invention.

The principles and operation of an apparatus for recovery of gold from gold containing material such as electronic waste material and/or extraction of gold from minerals, ores and sands according to the present invention may be better understood with reference to the drawings and the accompanying description. It should be understood that these drawings are given for illustrative purposes only and are not meant to be limiting.

In one embodiment, this invention provides a method for recovery of gold from gold-containing material, the method comprising:

crushing said gold-containing material to obtain a gold-containing particulate material including particles having a predetermined grain size;

optionally subliming other metals from said material;

preheating said gold-containing particulate material in an oxygen-containing gas environment in a preheating zone to oxidize gold-containing particulate material;

mixing the oxidized gold-containing particulate material with a chlorine-containing material;

treating the mixture of the oxidized gold-containing particulate material with a chlorine-containing material in a reaction zone by (i) heating the mixture to provide thermal decomposition of the chlorine-containing material and produce a chlorine-containing gas mixture, (ii) applying an electromagnetic field to the chlorine-containing gas mixture to provide ionization of chlorine; thereby causing a chemical reaction between gold and chlorine ions and providing a volatile gold-containing chloride product in the reaction zone; and cooling said volatile gold-containing chloride product to convert said volatile gold-containing chloride product into solid phase gold-containing materials.

In one embodiment, this invention is directed to a method for recovery of gold from gold-containing material, wherein the gold-containing material comprises gold, arsenic, antimony or combination thereof, the method comprising:

crushing said gold-containing material to obtain a gold-containing particulate material including particles having a predetermined grain size;

mixing said gold-containing particulate material with coal;

heating and reduce said mixture of the gold-containing particulate material and coal at temperatures of 500-900° C. for subliming arsenic and antimony from said reduced gold-containing material;

preheating said reduced gold-containing particulate material in an oxygen-containing gas environment in a preheating zone to oxidize gold-containing particulate material;

mixing the oxidized gold-containing particulate material with a chlorine-containing material;

treating the mixture of the oxidized gold-containing particulate material with a chlorine-containing material in a reaction zone by (i) heating the mixture to provide thermal decomposition of the chlorine-containing material and produce a chlorine-containing gas mixture, (ii) applying an electromagnetic field to the chlorine-containing gas mixture to provide ionization of chlorine; thereby causing a chemical reaction between gold and chlorine ions and providing a volatile gold-containing chloride product in the reaction zone; and cooling said volatile gold-containing chloride product to convert said volatile gold-containing chloride product into solid phase gold-containing materials.

In another embodiment, the gold-containing material is selected from used gold-containing printed circuit boards, gold-containing parts of electronic devices, waste gold-containing electrical connectors and gold-containing minerals, ores and sands.

In another embodiment, the predetermined grain size of said gold-containing particulate material is in the range of 0.07 mm to 40 mm.

In another embodiment, if the gold containing material comprises arsenic, antimony or combination thereof at a concentration of above 0.1 wt %, a sublimation step is required to remove these metals. In another embodiment, the sublimation step is at a temperature of between 500 to 900 degrees Celsius. In another embodiment, the sublimation step is at a temperature between 500 to 700 degrees Celsius; 650 to 750 degrees Celsius; 600 to 800 degrees Celsius; or 700 to 900 degrees Celsius. In another embodiment, the gold-containing material comprising gold, arsenic, antimony or combination thereof is mixed with coal and heated to a temperature of between 500-900° C., in another embodiment, heated to a temperatures of between 500 to 700 degrees Celsius; 650 to 750 degrees Celsius; 600 to 800 degrees Celsius; or 700 to 900 degrees Celsius.

In another embodiment, coal consumption is 130-170% of the stoichiometric coal quantity required for the full reduce reaction of arsenic and antimony oxides with carbon.

In the present description and claims, the expression "gold-containing material" or "gold-containing materials" is broadly used, whether alone or in combination, for any material containing gold, such as minerals, ores and sands and electric waste material.

In the present description and claims, the expression "electronic waste material" is broadly used, whether alone or in combination, for electrical or electronic equipment including gold containing components, sub-assemblies and consumables, which have been discarded by their users. Examples of electronic waste material include, but are not limited to, gold-containing printed circuit boards, gold-containing parts of electronic devices and gold-containing electrical connectors, etc.

It will be appreciated that electronic waste (e-waste) can be composed of a large number of components of various sizes, shapes and chemicals. For example, printed circuit boards that can be found in electrical and electronics appliances are composed of 40% metals, 30% polymers and 30% ceramics. However, the method of the present invention is insensitive to the presence of metals other than gold and to the presence of other materials.

Referring to FIG. 1, a schematic presentation of a method for recovery of gold from gold containing material, such as electronic waste material, minerals, ores or sands is shown, according to an embodiment of the present invention. An initial step, crushing gold containing material is carried out. During such crushing, gold containing material is converted into particles whose mean particle size may range, for example from 0.07 millimeter to 40 millimeters. This stage enables preparation of a product which is, on the one hand, more homogeneous and, on the other, more treatable in the subsequent method steps, according to the present invention.

Electronic waste material or minerals, ores and sands may contain materials, such as polymers, resins, fibers, cellulose paper, sulfur and other combustible material, which can ignite and decompose during subsequent treatment steps and thus provide impurities in the final product. Therefore, the method includes preheating the particulate material in an oxygen-containing gas environment to oxidize particulate material. The preheating of the particulate material is carried out in a furnace that provides a preheating zone having a temperature high enough, and for as long as is required, to cause oxidation of the particulate material. For example, the temperature can be in the range of 150 degrees Celsius to 750 degrees Celsius. The preheating of the particulate material can, for example, be carried out for a time period in the range of 5 min to 60 min. A content of oxygen in the preheating zone can, for example, be in the range of 20 volume percent to 98 volume percent.

The method further includes mixing the oxidized particulate material with a chlorine-containing material. The chlorine-containing material can, for example, be in a particulate form. An amount of the chlorine-containing material in the mixture depends upon an amount of the electronic waste material or minerals, ores and sands and/or a size of the reactor. For example, the amount of the chlorine-containing material in the mixture can be in the range of 1 gram to 1 kilogram per kilogram of the electronic waste material or minerals, ores and sands. In another embodiment, the chlorine-containing material in the mixture is in the range of 1 gram to 0.5 kilogram per kilogram of the gold-containing material. In another embodiment, the chlorine-containing material in the mixture is in the range of 200 g to 700 g per kilogram of the gold-containing material.

Examples of chlorine-containing materials suitable for the present invention include, but are not limited to, potassium hypochlorite, sodium hypochlorite, calcium hypochlorite, magnesium hypochlorite, barium hypochlorite, potassium chloride-hypochlorite, sodium chloride-hypochlorite, calcium chloride-hypochlorite, magnesium chloride-hypochlorite, barium chloride-hypochlorite, potassium chloride, sodium chloride, ammonium chloride, calcium chloride, magnesium chloride, barium chloride, aluminum chloride, nano silica and any combination thereof.

When a combination of two or more different chlorine-containing materials is used, a concentration of the components in the composition can be varied in broad limits. For example, when the chlorine-containing material is a composition of calcium hypochlorite and calcium chloride, wherein an amount of calcium hypochlorite in said composition of calcium hypochlorite and calcium chloride can be in the range of 5% to 99% weight percent. In another embodiment, the amount of calcium hypochlorite in said composition is between 10 to 20 wt %, 20 to 50 wt %, 30 to 60 wt % or 50 to 100 wt %.

Another example of the chlorine-containing material can have a composition of calcium hypochlorite, calcium chloride and nano silica. Yet another example of the chlorine-containing material can have a composition of calcium hypochlorite and nano silica, wherein said calcium hypochlorite is mixed with nano silica in solid or liquid form for better decomposition of said calcium hypochlorite to produce chlorine-containing gas mixture, wherein said nano silica have particles size is between 10-1000 nm. In other embodiments, the nano silica have particles size of less than 200 nm.

The method further includes treating the mixture of the oxidized particulate material with a chlorine-containing material in a reaction zone by heating the mixture to provide thermal decomposition of the chlorine-containing material and thus to produce a chlorine-containing gas mixture, and also by applying an electromagnetic field to the produced chlorine-containing gas mixture to form a chlorine plasma.

Figure 2:
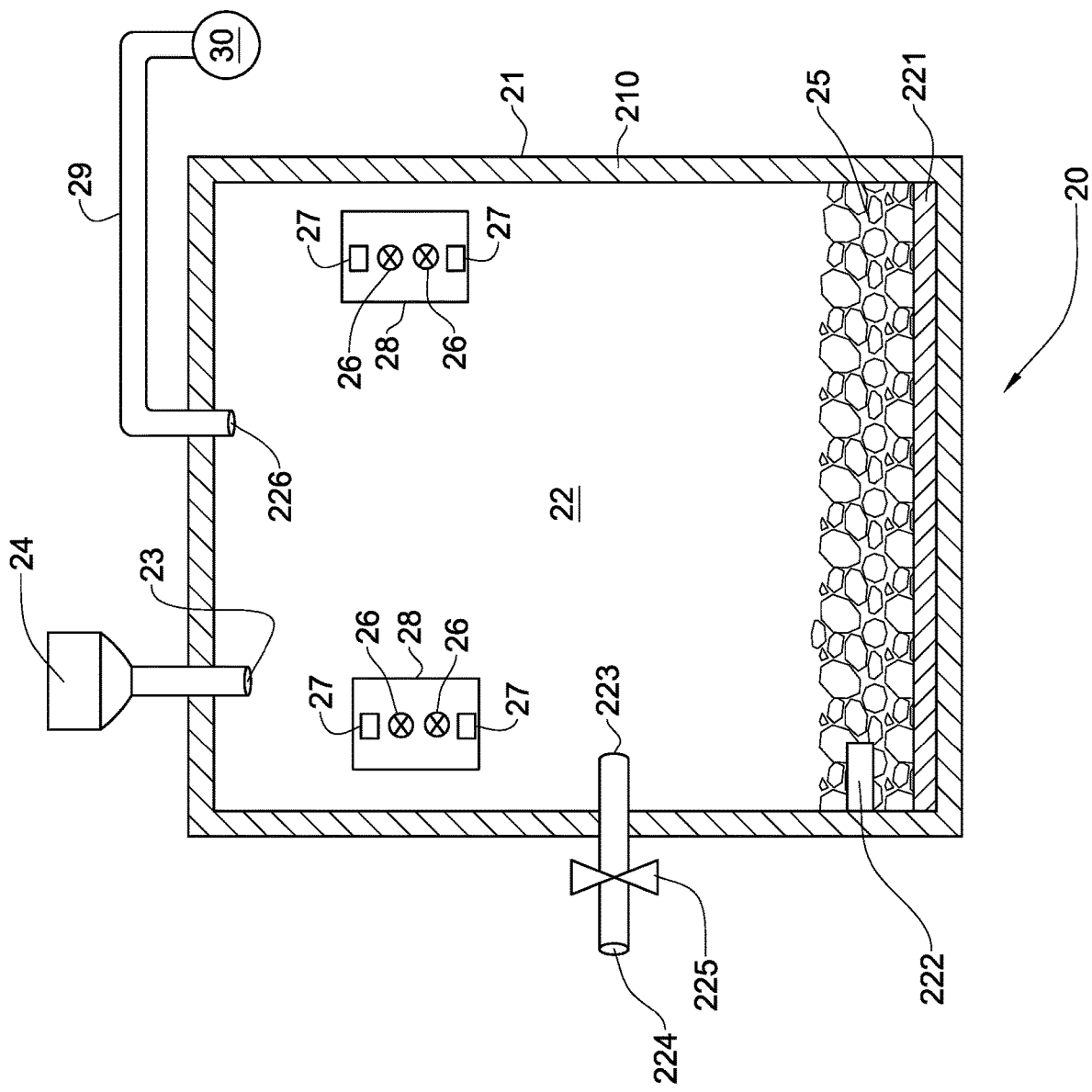
FIG. 2 illustrates a schematic fragmentary longitudinal cross-sectional view of an apparatus for treatment of a mixture of oxidized particulate material with a chlorine-containing material, according to an embodiment of the present invention.

FIG. 2 illustrates a schematic fragmentary longitudinal cross-sectional view of an apparatus for treatment of a mixture of an oxidized particulate material with a chlorine-containing material by heating the mixture and applying an electromagnetic field, according to an embodiment of the present invention. It should be noted that this figure is not to scale, and is not in proportion, for purposes of clarity. It should also be noted that the blocks, as well other elements in this figure, are intended as functional entities only, such that the functional relationships between the entities are shown, rather than any physical connections and/or physical relationships. Examples of constructions, materials, dimensions, and manufacturing processes are provided for selected elements. Those versed in the art should appreciate that many of the examples provided have suitable alternatives which may be utilized.

According to an embodiment of the present invention, the apparatus 20 for treatment of a mixture 25 of an oxidized particulate material with a chlorine-containing material includes a housing 21 having housing walls 210. The term "housing" is broadly used to describe any container, tank, chamber, vessel, cartridge, surrounding housing, frame assembly or any other structure that can be used for carrying out a process for recovery or extraction of gold from e-waste or minerals, ores and sands, respectively, in accordance with the teaching of the present invention.

The housing walls 210 define a reactor 22 with a reaction zone in which the mixture 25 is heated and subjected to an electromagnetic field. It should be understood that the housing 21 may have any desired dimension and shape, such as cylindrical, prismatic, etc. Moreover, the dimension of the cavities may have any desired size distribution.

An inner surface of the housing walls 210 may be made from any suitable materials. Examples of such materials include, but are not limited to, a ceramic material containing at least one element selected from silica-based, alumina-based, magnesia-based or zirconia-based ceramic materials and any combination thereof.

The mixture of the oxidized particulate material with a chlorine-containing material can be fed into the reactor 22 in various suitable ways. For example, it can be provided through a feeding inlet 23 arranged in the housing walls 210. For this purpose, a feed-hopper 24 can, for example, be arranged at the feeding inlet 23. Although feeding inlet 23 is shown in FIG. 2 at a top of the housing 21, generally it can be arranged in any suitable place.

According to some embodiments, the reactor 22 includes a heater 221 configured to heat and maintain the mixture of the oxidized particulate material with a chlorine-containing material at a predetermined temperature. The temperature and duration of the heating is chosen to provide thermal decomposition of the chlorine-containing material and produce a chlorine-containing gas mixture. For example, the predetermined temperature can be in the range of about 150° C. to about 400° C. The heating of the mixture to provide thermal decomposition of the chlorine-containing material for producing a chlorine-containing gas mixture can be carried out for a time period in the range of 5 min to 120 min.

According to some embodiments, the reactor 22 can also include a temperature sensor 222 arranged in the reactor 22 within the mixture 25 and configured for measuring the predetermined temperature for controlling operation of the heater 221.

The method for recovery of gold from gold containing material, such as electronic waste material, minerals, ores and sands, includes applying an electromagnetic field to the chlorine-containing gas mixture in the reaction zone to provide ionization of chlorine.

Formation of chloride of gold is a kinetically limited process. It is known that when chlorine is present as an active radical, (e.g., in an aqua regia solution) chlorination is more rapid than when chlorination is carried out with chlorine molecules. Therefore, bringing gold into contact with a chlorine plasma (ions and radicals of chlorine instead of chlorine molecules) can also accelerate the chlorination process.

The advantage of plasma chlorination over chlorination by chlorine molecules is due to the fact that it can be achieved at temperatures that are much lower than those necessary for thermally-driven chlorination, and the low temperature chlorination process can be more selective with pure gold chloride production for recovering of gold.

Thus, according to an embodiment, the apparatus of the present invention includes an electromagnetic inductor 28 having electrodes 27 arranged in the housing 21, although an embodiment when the electrodes are arranged outside the housing 21 is also contemplated. The chlorine plasma can, for example, be held in the reaction zone by applying a static magnetic field that can be generated by induction coils 26 arranged in the housing 21, although an embodiment when the induction coils 26 are arranged outside the housing 21 is also contemplated. Application of an electromagnetic field to the chlorine-containing gas mixture, produced as a result of decomposition of the chlorine-containing material, can provide ionization of chlorine and form a chlorine plasma, thereby causing a chemical reaction between gold and chlorine ions and providing a volatile gold-containing chloride product in the reaction zone. Examples of such chemical reactions include, but are not limited to

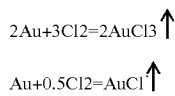

The irradiance of the electromagnetic field in the reaction zone is depended on the configuration of the apparatus, volume of the mixture 25 and pressure of the chlorine-containing gas mixture.

The pressure of the chlorine-containing gas mixture in the reaction zone can, for example, be in the range of 1 millibar to 1 bar. At these conditions, the ionization of chlorine molecules can, for example, be achieved by applying an alternating electromagnetic field to the reaction zone at the frequency in the range of 50 kHz-12 GHz. An irradiance of the electromagnetic field in the reaction zone can, for example, be in the range of 0.1 kW/cm$^2$ to 10 kW/cm$^2$.

In order to provide ionization of chlorine, the electromagnetic field can, for example, be applied to the chlorine-containing gas mixture for a time period in the range of 5 min to 180 min. The static magnetic field for holding the plasma in the reaction zone can have a strength between 0 and 2 Tesla.

According to an embodiment, the heating of the mixture of the oxidized particulate material with a chlorine-containing material in a reaction zone is carried out simultaneously with the applying of an electromagnetic field to the chlorine-containing gas mixture.

According to some embodiments, the reactor 22 includes a chlorine-containing gas inlet port 223 associated with an chlorine-containing gas inlet manifold 224 arranged in the housing walls 210, and configured for receiving a chlorine-containing gas from an external source (not shown), and directing a predetermined amount of the chlorine-containing gas into the reaction zone. The chlorine-containing gas can, for example, be a gas mixture of chlorine and a noble gas, such as argon; however, the gas mixture can also include nitrogen and/or oxygen.

In operation, the chlorine-containing gas can pass through the reaction zone and be added to the chlorine-containing gas mixture produced from the chlorine-containing material for ionization. An amount of the chlorine-containing gas that is passed from an external source through the reaction zone can, for example, be in the range of 5 liters to 400 liters chlorine per ton of said gold-containing material, such as electronic waste material or minerals, ores and sands. This provision can facilitate the chemical reaction between gold and chlorine ions. The chlorine-containing gas can, for example, pass through the reaction zone during heating and applying the electromagnetic field.

When desired, a chlorine-containing gas inlet valve 225 can be arranged within the chlorine-containing gas inlet manifold 224. The chlorine-containing gas inlet valve 225 is configured to regulate the ingress flow rate of the chlorine-containing gas. The term "valve" as used in the present description has a broad meaning and relates to any electrical and/or mechanical device adapted to regulate the flow rate of gases and liquids.

The apparatus 20 also includes one or more gold-containing vapor outlet ports 226 (only one outlet port 226 is shown in FIG. 2), and one or more corresponding cooling manifolds 29 (only one cooling manifold 29 is shown in FIG. 2) through which a gold-containing vapor is released from the reaction zone 22. The cooling manifold 29 is configured for cooling down the volatile gold-containing chloride product (i.e., gold-containing vapor) in order provide condensation, and thereby to convert the volatile gold-containing chloride product into solid phase gold-containing materials.

The cooling manifold 29 can be a tube made of a heat conductive material which is open to the atmospheric air and placed at room temperature. In this case, the cooling of the gold-containing vapor can be carried out during the passing of the material through the cooling manifold 29. When desired, the cooling manifold 29 can be arranged within a dedicated cooling device (not shown).

The apparatus 20 may include a gold-containing material collector 30 coupled to the gold-containing vapor outlet port 226 via the cooling manifold 29. The gold-containing material collector 30 can, for example, be any suitable vessel such as a container, tank, chamber, cartridge, housing, frame or any other structure that can be used for collecting and storing the solid phase materials obtained during condensation of the volatile gold-containing chloride product in accordance with the teaching of the present invention.

The apparatus 20 may include or be connectable to a control system (not shown) that is coupled to the chlorine-containing gas inlet valve 225 and configured for controlling operation thereof. Likewise, the control system can be adjusted to control operation of the heater 221. Specifically, the signals produced by the temperature sensor 222 can be relayed to the control system via a connecting wire (not shown), or wirelessly. In response to these signals, the control system can generate corresponding control signals to control operation of the heater 221.

Gold can be recovered from the gold-containing materials in the solid phase by any recovery means conventional in the art. For example, this may conveniently be achieved by dissolving the gold-containing condensed solid products in water and treating the solution with metallic zinc to reduce the gold.

As such, those skilled in the art to which the present invention pertains, can appreciate that while the present invention has been described in terms of preferred embodiments, the conception upon which this disclosure is based, may readily be utilized as a basis for the designing of other structural systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

The following examples are presented in order to more fully illustrate the preferred embodiments of the invention. They should in no way be construed, however, as limiting the broad scope of the invention.

EXAMPLES

Example 1

Recovery of Gold from Gold-Containing Material

Studies of low-temperature chlorine sintering of various industrial samples with a gold content of 4-12 ppm were conducted. The experiments were carried out in a furnace with heating elements from Kanthal (FeCrAl) at 200-350° C. in alumina crucibles. The initial sample was 60 g. Chlorine gas was used as chlorine-containing reagent and was supplied to the furnace with a considerable excess. The chlorine consumption was 10 ml/min. The duration of the experiment was 1 hour. For the reproducibility of the experiments, each experiment was carried out twice. Sublimated products were removed from the reaction zone by a gas stream.

The sample obtained after the sintering was analyzed by ICP-MS spectroscopy. The gold extraction yield from products without arsenic and antimony (0.05% As, 0.003% Sb) was 80-90%. The sublimation of non-ferrous (Cu, Pb, Ag, Zn) and iron was not detected.

Example 2

Recovery of Gold from Arsenic, Antimony Gold-Containing Materials

It was found that the presence of the arsenic, antimony or combination thereof in a gold-containing material, dramatically reduces gold recovery from 90% to 30-40%.

In order to recover gold in high percentage arsenic and antimony were first removed from the product. The second stage of the process must be selective extraction of gold as described in Example 1.

During the sintering of materials containing arsenic and antimony (0.6% As, 0.3% Sb), a high sublimation of arsenic and antimony (70-75%) was obtained. At the same time, gold extraction was sharply reduced to 30-40%.

To prevent the arsenic and antimony sublimation, preliminary studies were carried out to beforehand remove arsenic and antimony from the initial material. Thermodynamic calculations for all reactions were carry out. The pre-ground initial sample was 60 g (As—0.71%, Sb—0.65%, Cu—11%, Zn—3.7%, Pb—38%, Au—30 ppm, Ag—100 ppm, Fe—2.4%) was mixed with coal and reduced at temperatures of 500° C., 700° C. and 900° C. The coal consumption was 150% of the stoichiometric coal quantity required for the full reduce reaction of arsenic and antimony oxides with carbon. The best results were obtained at a temperature of ~700° C. An almost complete selective arsenic and antimony sublimation (up to 99%) was obtained.

Sublimation of other non-ferrous metals have not been detected. Gold almost completely remained in the clinker. The results of the experiments show that the technological process of sintering with chlorine must be accompanied by a preliminary stage of arsenic and antimony removal from the initial material. Sintering of the initial material with coal will significantly increase the gold extraction in the form of its chloride to the commercial product.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A method for recovery of gold from gold-containing material, the method comprising:
crushing said gold-containing material to obtain a gold-containing particulate material including particles having a predetermined grain size;
optionally subliming other metals from said material;
preheating said gold-containing particulate material in an oxygen-containing gas environment in a preheating zone to oxidize gold-containing particulate material;
mixing the oxidized gold-containing particulate material with a composition comprising chlorine-containing material and nano silica;
treating the mixture of the oxidized gold-containing particulate material with a chlorine-containing material in a reaction zone by (i) heating said mixture to provide thermal decomposition of the chlorine-containing material and produce a chlorine-containing gas mixture, (ii) applying an electromagnetic field to the chlorine-containing gas mixture to provide ionization of chlorine; thereby causing a chemical reaction between gold and chlorine ions and providing a volatile gold-containing chloride product in the reaction zone; and
cooling said volatile gold-containing chloride product to convert said volatile gold-containing chloride product into solid phase gold-containing materials.

2. The method of claim 1, wherein the gold-containing material is selected from used gold-containing printed circuit boards, gold-containing parts of electronic devices, waste gold-containing electrical connectors and gold-containing minerals, ores and sands.

3. The method of claim 1, wherein said predetermined grain size of said gold-containing particulate material is in the range of 0.07 mm to 40 mm.

4. The method of claim 1, wherein the subliming step of other metals is at a temperature between 500 to 900 degrees Celsius.

5. The method of claim 1, wherein an amount of the chlorine-containing material in the mixture of the oxidized gold-containing particulate material with a chlorine-containing material is in the range of 1 gram to 1 kilogram per kilogram of the gold-containing material.

6. The method of claim 1, wherein said chlorine-containing material is a particulate material selected from potassium hypochlorite, sodium hypochlorite, calcium hypochlorite, magnesium hypochlorite, barium hypochlorite, potassium chloride-hypochlorite, sodium chloride-hypochlorite, calcium chloride-hypochlorite, magnesium chloride-hypochlorite, barium chloride-hypochlorite, potassium chloride, sodium chloride, ammonium chloride, calcium chloride, magnesium chloride, barium chloride, aluminum chloride, or any combination thereof.

7. The method of claim 1, wherein said composition comprising chlorine- containing material and nano silica, consists of a mixture of calcium hypochlorite, calcium chloride and nano silica.

8. The method of claim 1, wherein said composition comprising chlorine- containing material and nano silica, consists of calcium hypochlorite and nano silica.

9. The method of claim 1, wherein said nano silica have particles size than between 10-200 nm.

10. The method of claim 1, wherein said preheating of the gold-containing particulate material is carried out at a temperature in the range of 150 degrees Celsius to 750 degrees Celsius.

11. The method of claim 1, wherein said preheating of the gold-containing particulate material is carried out for a time period in the range of 5 min to 60 min.

12. The method of claim 1, wherein a content of oxygen in said oxygen-containing gas environment in the preheating zone is in the range of 20 volume percent to 98 volume percent.

13. The method of claim 1, wherein said heating the mixture of the oxidized gold-containing particulate material with a chlorine-containing material to provide thermal decomposition of the chlorine-containing material and produce a chlorine-containing gas mixture is carried out at a temperature in the range of 150 degrees Celsius to 400 degrees Celsius.

14. The method of claim 1, wherein said heating the mixture of the oxidized gold-containing particulate material with a chlorine-containing material to provide thermal decomposition of the chlorine-containing material and produce the chlorine-containing gas mixture is carried out for a time period in the range of 5 min to 120 min.

15. The method of claim 1, further comprising passing a chlorine-containing gas from an external source through the reaction zone during the applying of an electromagnetic field.

16. The method of claim 1, wherein a frequency of the electromagnetic field in the reaction zone is in the range of 50 kHz-12 GHz.

17. The method of claim 1, wherein an irradiance of the electromagnetic field in the reaction zone is in the range of 0.1 kW/cm$^2$ to 10 kW/cm$^2$.

18. The method of claim 1, wherein said applying of the electromagnetic field to the chlorine-containing gas mixture to provide ionization of chlorine is carried out for a time period in the range of 5 min to 180 min.

19. The method of claim 1, wherein said heating of the mixture of the oxidized gold-containing particulate material with the chlorine-containing material in the reaction zone is carried out simultaneously with said applying of electromagnetic field to the chlorine-containing gas mixture.

20. The method of claim 1, wherein the other metals of said gold containing particulate material comprise arsenic and antimony and said arsenic and antimony are being sublimed by mixing with coal and reduced at temperatures of 500-900° C.

21. The method of claim 4, wherein said other metals comprise arsenic, antimony or combination thereof.

22. The method of claim 8, wherein said calcium hypochlorite is mixed with nano silica in solid or liquid form for better decomposition of said calcium hypochlorite to produce said chlorine-containing gas mixture.

23. The method of claim 7 wherein an amount of calcium hypochlorite in said composition of calcium hypochlorite and calcium chloride is in the range of 5 to 99 weight percent.

24. The method of claim 15, wherein an amount of the chlorine-containing gas being passed from an external source through the reaction zone is in the range of 5 liters to 400 liters chlorine per a ton of said gold-containing material.

25. The method of claim 20, wherein the coal consumption is 130-170% of the stoichiometric coal quantity required for the full reduction reaction of arsenic and antimony oxides with carbon.

* * * * *